T. PARKINSON.
Gate.
No. 7,548.
Patented Aug. 6, 1850.
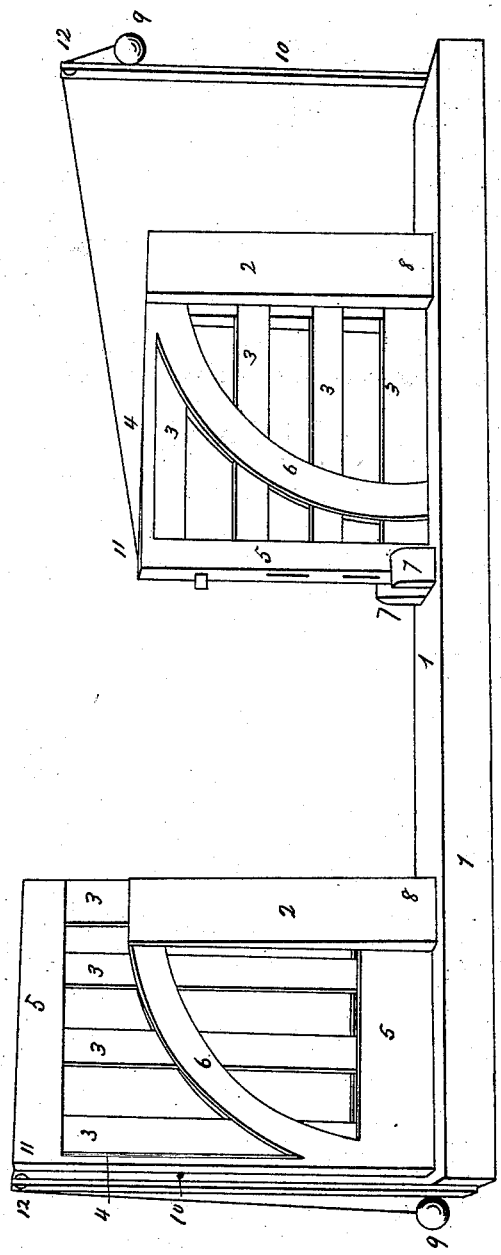

UNITED STATES PATENT OFFICE.

THOS. PARKINSON, OF NAPLES, NEW YORK.

HANGING AND OPERATING GATES.

Specification of Letters Patent No. 7,548, dated August 6, 1850.

*To all whom it may concern:*

Be it known that I, THOMAS PARKINSON, of the town of Naples, in the county of Ontario and State of New York, have invented a new and useful Farm-Gate, which I denominate "The Farmer's Favorite"; and I do hereby declare that the following is a full and exact description thereof, reference being had to the accompanying drawings and figures of reference marked thereon.

The nature of my invention consists in a gate of two separate parts of equal size sufficiently large to fill the required opening and which are severally opened with the hand assisted by weights throwing them over upon an axis placed at the outer lower corner of each half of the gate.

To enable others skilled in the art to make and use my invention I will proceed to describe its construction and operation.

Let figures 1, 1, be the ground or sill in which I place at each end of the opening two posts 2, 2, in shape resembling sawed fence posts, but at least twelve inches wide their perpendicular sides facing each other but at a sufficient distance apart to admit the thickness of the gate between them. In case the ground be chosen instead of the sill I place at each end of the opening one solid post sawed to the shape of the two above mentioned. I next construct the gate in two separate parts of four bars 3, 3, 3, 3, with cap 4, and battens 5. At each end and on each side after the manner of a panel of board fence sufficiently long when placed end to end to fill the space between the outer edges of the two posts. The brace 6, 6, answers the twofold purpose of strengthening the gate and filling the gain of the double post as the gate opens. Figure 7, is a gained block of wood forming a nut for the gate in the middle of the opening when closed, while 8, is the axis on which the gate turns in opening the operation of which is assisted by the weight 9, running down the post 10, secured by a cord at point 11, after passing over the pulley 12, at the top of the said post.

What I claim as my invention and desire to secure by Letters Patent is—

The manner of hanging and operating the gates substantially as described.

THOMAS PARKINSON.

Witnesses:
N. W. CLARK,
G. W. PARKINSON.